April 17, 1928.  H. NADEL  1,666,662
HOLDING DEVICE
Filed Sept. 19, 1927
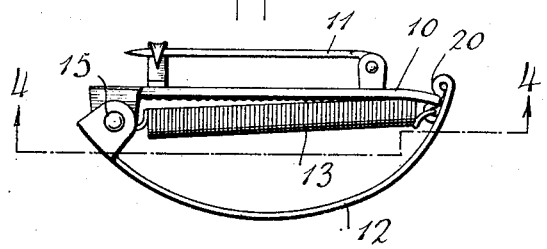
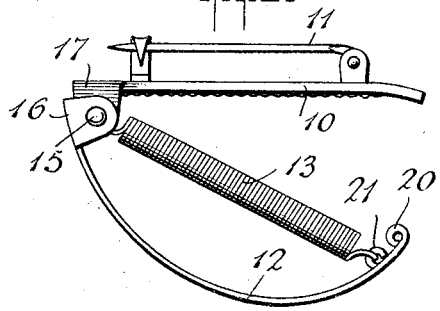
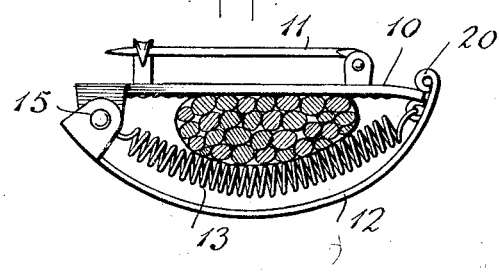
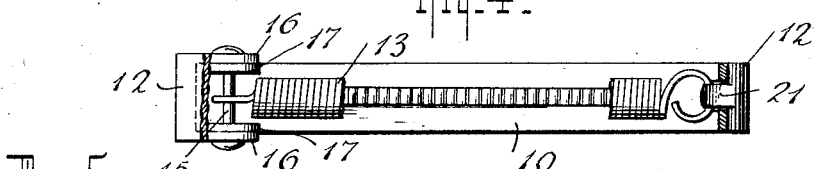
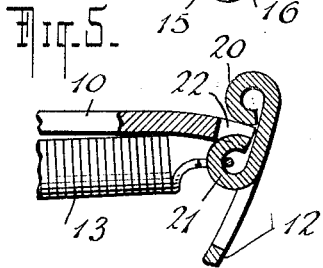
INVENTOR
Harry Nadel
BY Arthur L Reist
his ATTORNEY Patented Apr. 17, 1928.

UNITED STATES PATENT OFFICE.

HARRY NADEL, OF NEW YORK, N. Y.

HOLDING DEVICE.

Application filed September 19, 1927. Serial No. 220,602.

This invention relates to holding devices intended especially for holding flowers to be worn on a person's garment, but also useful for holding other articles and in other positions. The invention aims to provide an improved device of this character, and especially to provide a device of attractive appearance and of simple construction which shall be convenient to use and shall securely hold the stems of flowers inserted therein.

An understanding of the invention can best be given by a detailed description of an approved flower holder embodying the invention, and such a description will now be given in connection with the accompanying drawings illustrating such a device, in which:

Fig. 1 is a side view of the device;

Fig. 2 is a side view showing the device opened to permit the stems of flowers to be inserted in the holder;

Fig. 3 is a similar view showing the device closed and holding a bunch of flower stems;

Fig. 4 is a sectional view taken on line 4—4 of Fig. 1; and

Fig. 5 is an enlarged detail view of the catch end of the device.

Referring to the drawings, the device includes a rigid main bar 10 to which a safety pin 11 is attached, an outwardly bowed bar 12 pivotally connected at one end to the bar 10 and releasably held to the bar 10 at its other end, and a spiral spring 13 tensioned between the ends of the bowed bar 12 and tending when the device is closed to lie close to the bar 10. The bar 12 is pivotally connected to the bar 10 by a pivot pin 15 extending through ears 16 extending rearwardly from the end of the bar 12 and forwardly projecting ears 17 on the end of the bar 10. The bar 12 is somewhat flexible and resilient and its free end is formed to serve as a spring catch to engage the end of the bar 10. Most desirably the bar 12 is made of a flat strip of metal or other slidable material of suitable width to give an ornamental appearance to the device and may be embellished as desired, and the free end of the bar is turned inward to form a lug 20 to snap and catch over the end of the bar 10.

The spiral spring 13 is connected at one end to the pivot pin 12 and at the other end to an eye 21 stamped out of the bar 12 close to the lug 20 so that the spring tends to lie close to the bar 10 when the device is closed. The spring serves as a spring band for resiliently holding stems of flowers between it and the bar 10, and also serves to put a slight tension on the catch end of the bowed bar 12 to aid in holding it against the end of the bar 10. The eye 21 serves also as a stop for the end of the bar 10, and in order to prevent relative lateral movement between the ends of the bars, the end of the bar 10 is formed with a central notch 22 to receive the edge of the eye 21 as shown.

To secure the stems of flowers in the device, the end of the bar 12 is sprung out to disconnect it from the bar 10, and is swung away from the bar 10 as shown in Fig. 2. The flower stems are then placed between the bar 10 and the spring 13, and the bar 12 is swung back and its end snapped over the end of the bar 10. As the device is closed, the spring is deflected outwardly toward the bowed bar and holds the flower stems pressed against the bar 10.

What I claim is:

1. A holding device, comprising a pin bar, an outwardly bowed bar pivotally connected at one end to the pin bar, means for releasably connecting the other end of the bowed bar to the pin bar, and a tension spring stretched between the ends of the bowed bar.

2. A holding device, comprising a main bar, an outwardly bowed spring bar pivotally connected at one end to the main bar, means for releasably connecting the other end of the bowed bar to the main bar, and a spiral tension spring extending between the ends of the bowed bar.

3. A holding device, comprising a main bar, an outwardly bowed spring bar pivotally connected at one end to the main bar, a tension spring extending between the ends of the bowed bar, a lug at the free end of the bowed bar to snap over the end of the main bar, and means for preventing relative lateral displacement of the releasably connected ends of said bars.

4. A holding device, comprising a rigid flat bar, an outwardly bowed flat spring bar pivotally connected at one end to the rigid bar, and a tension spring extending between the ends of the bowed bar, the bowed bar having its free end turned to form a lug to catch over the end of the rigid bar and having an eye close to said lug for attaching the end of the spring.

5. A holding device, comprising a rigid flat bar, an outwardly bowed flat spring bar pivotally connected at one end to the rigid bar, a tension spring extending between the ends of the bowed bar, the bowed bar having its free end turned to form a lug to catch over the end of the rigid bar and having an eye close to said lug for attaching the end of the spring, and the end of the rigid bar being notched to straddle the edge of said eye.

In testimony whereof I have hereunto set my hand.

HARRY NADEL.